United States Patent Office 2,947,574
Patented Aug. 2, 1960

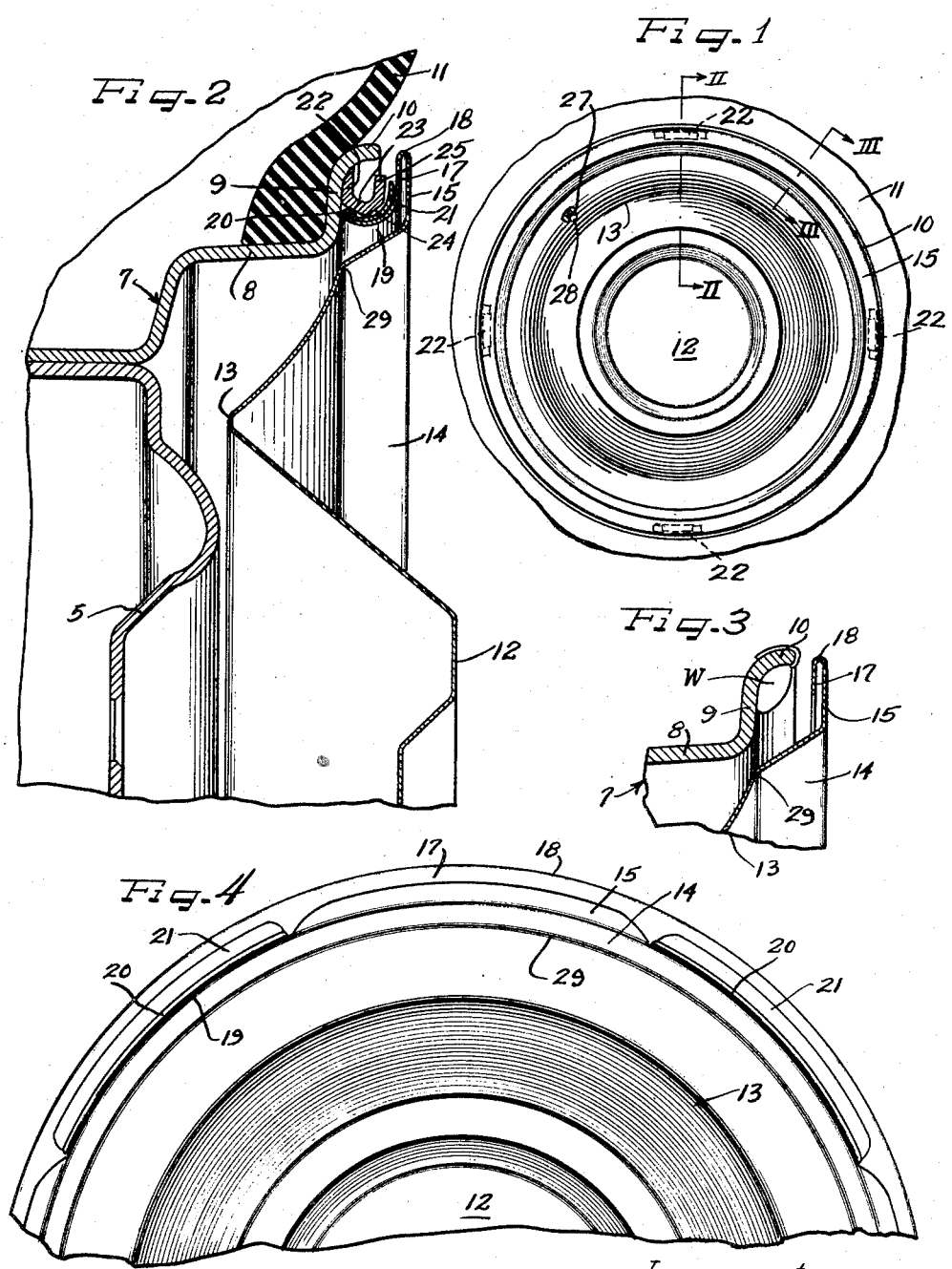

2,947,574

WHEEL COVER

George Albert Lyon, 13881 W. Chicago Blvd., Detroit 28, Mich.

Filed Apr. 15, 1957, Ser. No. 652,915

5 Claims. (Cl. 301—37)

The present invention relates to improvements in wheel structures and particularly concerns the ornamental and protective covering of the outer sides of vehicle wheels.

An important object of the present invention is to provide an improved wheel structure wherein a wheel cover is retained on the outer side of the wheel in a novel manner.

Another object of the invention is to provide a wheel cover with improved cover retaining means.

A further object of the invention is to provide a wheel structure wherein a tire rim has rigid means on the terminal flange thereof retainingly engageable with resilient cover retaining finger structure behind a marginal portion of a wheel cover.

Still another object of the invention is to provide a wheel structure wherein a wheel cover is supported in press-on pry-off relation with respect to retaining means on the terminal flange of a tire rim and provides ample space and clearance for reception of wheel balancing weights.

Another object of the invention is to provide a vehicle wheel cover having short, resilient, substantially reinforced cover retaining finger structure for press-on pry-off retaining engagement with rigid cover retaining shoulder means on the terminal flange of a vehicle wheel in a manner facilitating pry-off for releasing the cover from the wheel.

Other objects, features and advantages of the present invention will be readily apparent from the following detailed description of a preferred embodiment thereof taken in conjunction with the accompanying drawing, in which Figure 1 is an outer side elevational view of a wheel structure embodying features of the invention;

Figure 2 is an enlarged fragmentary radial sectional detail view taken substantially on the line II—II of Figure 1;

Figure 3 is a fragmentary radial sectional detail view taken substantially on line III—III of Figure 1; and Figure 4 is a fragmentary rear elevational view of the cover.

A wheel cover according to the present invention is adapted to be applied to the outer side of a vehicle wheel including a disk spider wheel body 5 carrying a drop center, multi-flange tire rim 7 including an intermediate flange 8 merging with a generally radially outwardly extending and axially outwardly facing terminal flange portion 9 at the radial outer side of which is a generally axially outwardly extending terminal lip portion 10. A pneumatic tire, which may be a tubeless tire 11 is adapted to be supported by the tire rim.

The cover is shown as a full disk cover, that is a cover that is dimensioned to substantially entirely overlie the wheel, inclusive of the wheel body 5 and the tire rim 7, although it will be apparent that if preferred the cover may be made in two parts, one comprising a trim ring and the other a hub cap, but the cover retaining means in the present invention is especially suitable for a full disk type of cover.

Herein the cover comprises a central crown portion 12 about which is an inwardly indented annular dished intermediate portion 13 having at the radial outer side thereof a marginal portion including an annular generally axially outwardly and slightly radially outwardly oblique, first portion 14 and a radially outwardly extending and axially outwardly facing second marginal portion 15 which is adapted to overlie the tire rim and has a turned under and radially inwardly extending reinforcing flange 17 providing at juncture with the portion 15 a smooth riblike reinforcing and finishing edge 18.

For retaining the cover on the outer side of the wheel, means are provided behind the marginal portion 15 for engagement with rigid cover-retaining means carried by the terminal flange. To this end, the underturned flange portion 17 of the cover margin is provided with a plurality of generally axially inwardly projecting retaining finger extensions 19 which in a desirable form are four in number symmetrically circumferentially spaced and in the manufacture of the cover derived from four corners of a quadrangular sheet metal blank such as stainless steel, brass, aluminum alloy or the like.

Each of the retaining fingers 19 is of substantial width and curved in circumferential direction as best seen in Figure 4, as well as in axial or longitudinal direction as seen in Figure 2, so that they are of substantial resilient stiffness. Further resilient stiffness is afforded in the fingers 19 by providing the same with turned, and this instance bead-like, terminal structure 20 extending throughout the width of the fingers and also curved in the circumferential direction and thus of substantial resilient stiffness.

Additional reinforcement and resiliency is afforded for the fingers by providing the same with a turned back, free lamination extremity portion 21. In the present instance, the lamination portion 21 is turned to the radially outer side of the retaining fingers into the generally radially outwardly opening groove that is defined by the generally radially outwardly and axially inward turning of the terminal portions of the fingers toward the terminal bead 20.

The construction and relationship of the retaining fingers 19 is such that they are disposed on a diameter which is greater than the diameter of the axially outer portion of the intermediate flange 8 of the tire rim but substantially smaller than the diameter of the inside face of the terminal flange lip portion 10. Therefore, cover retaining rigid members 22 carried by the terminal flange portion 9 spaced radially inwardly from the lip portion 10 and radially outwardly relative to the adjacent outer end portion of the intermediate flange 8 are adapted to be engaged by the retaining fingers 19 of the cover in press-on, pry-off relation.

In the present instance the cover retaining members 22 are rigid lug-like structures that are adapted to be welded onto the axially outer face of the terminal flange portion 9 and with turned up cover retaining shoulder means 23 thereon facing generally radially and axially inwardly and disposed in radially outwardly spaced relation to the adjacent juncture of the terminal flange portion 9 and the intermediate flange 8. Immediately axially outwardly from the generally undercut retaining shoulder 23 is a lead-in generally radially and axially inwardly sloping surface portion 24 from which extends generally radially outwardly a guard portion 25 which overlies the base portion of the retaining member. There are as many of the retaining members 22 as there are retaining fingers 19, herein four in number symmetrically spaced circumferentially.

In applying the cover to the outer side of the wheel, a valve stem aperture 27 in the radially outer portion of the intermediate dished part 13 of the cover is registered with a valve stem 28 and this may generally align the adjacent pair of cover retaining fingers 19 with the cover retaining members 22 located at the respective opposite sides of the valve stem 27. Then, by applying axially inward pressure to the cover and more particularly the marginal portion 15 thereof, the remaining retaining fingers 19 are snapped into retaining engagement with the retaining members by camming of the retaining bead terminals 20 of the retaining fingers over the lead-in surfaces 24 of the retaining members and then snapping in behind the retaining shoulders 23 into resilient engagement therewith.

It will be appreciated, of course, that the retaining terminals 20 are normally disposed on a slightly greater diameter than the diameter described about the retaining shoulders 23 so that in the fully assembled relationship of the cover on the wheel, the retaining fingers 19 will be placed under substantial resilient tension by radially inward deflection thereof upon entering engagement with the retaining members. Inasmuch as the retaining fingers are curved or bowed or arched inwardly so as to provide generally radially outwardly opening grooves, the radially inwardly projecting shoulder at juncture of the shoulder portion 23 with the lead-in surface portion 24 is freely accommodated within the groove.

In the fully assembled relationship of the cover on the wheel, furthermore, the retaining terminal beads 20 of the retaining fingers seat or bottom against the opposing face of the terminal flange portion 9 radially and axially inwardly from the retaining shoulders 23 of the retaining members. This defines the axially inward disposition of the cover on the wheel and, in fact, maintains the cover in spaced relation to not only the tire rim 7 but also the wheel body 5. In addition, the length of the retaining fingers 19 is such as to maintain the underturned flange portion 17 of the cover margin in substantially spaced relation to the terminal flange lip portion 10. Moreover, the cover margin portions 14 and 15 with the underturned flange 17 afford a substantial chamber therebehind cooperative with the terminal flange 9, 10 for accommodating wheel weights W that may be desirable for balancing the wheel.

For removing the cover from the outer side of the wheel, a pry-off tool is adapted to be inserted into the gap between the cover edge 18 and behind the underturned flange 17 and engaged with the retaining bead 20 of any selected one of the retaining fingers 19 for applying a leverage thereto to snap the associated retaining finger free from the retaining member 22. Should, however, the pry-off tool be inserted between any given pair of the retaining fingers 19, it will be engaged against a reinforcing and pry-off shoulder rib 29 at the inner side of the marginal portion 14 of the cover at juncture thereof with the dished portion 14 and located opposite juncture of the intermediate flange 8 with the terminal flange portion 9 of the tire rim. Inasmuch as the pry-off rib 29 is disposed radially inwardly with respect to the diameter defined by the retaining finger terminals 20, pry-off leverage applied thereto will be effective to snap the adjacent retaining fingers free from the retaining members 22.

It will be appreciated that by reason of the fact that the retaining members 22 on the tire rim are secured thereto, the radially inward relationship on the terminal flange portion 9 can be predetermined, as can also the corresponding location of the terminals of the retaining fingers 19 so that a selective diameter for any given automobile model or make can be afforded to discourage theft and transfer of covers to any other model or make of automobile.

It will be understood that modifications and variations may be effected without departing from the scope of the novel concepts of the present invention.

I claim as my invention:

1. In a wheel structure including a terminal flange having a generally radially extending and axially outwardly facing portion joining a generally axially outwardly extending and radially inwardly facing lip portion, a circumferentially spaced plurality of cover retaining members welded to the radially extending terminal flange portion and providing cover retaining shoulders spaced radially inwardly from said lip portion, a cover for disposition at the outer side of the wheel including a circumferentially spaced series of underturned marginal cover retaining fingers of substantial width and provided with circumferentially arcuate terminal bead structure engageable in press-on pry-off relation with said retaining member shoulders and also engageable in bottoming relation against the radially extending terminal flange portion radially and axially inwardly from said shoulders for holding the cover in spaced relation to the wheel.

2. In a wheel structure including a terminal flange having a generally radially extending and axially outwardly facing portion joining a generally axially outwardly extending and radially inwardly facing lip portion, a circumferentially spaced plurality of cover retaining members of limited circumferential width secured to the radially extending terminal flange portion and providing cover retaining shoulders spaced radially inwardly from said lip portion, a cover for disposition at the outer side of the wheel including a circumferentially spaced series of underturned marginal cover retaining fingers of substantial width and provided with terminal structure engageable in press-on pry-off relation with said retaining member shoulders and also engageable in bottoming relation against the radially extending terminal flange portion radially and axially inwardly from said shoulders for holding the cover in spaced relation to the wheel, said terminal structure being of circumferential dimension greater than said retaining members so as to be disposed circumferentially clear therebeyond in portions thereof, the cover having an outer marginal portion in gap relation to said terminal flange and affording access by means of a pry-off tool to said circumferentially disposed portions of said terminal structure for disengaging the terminal structure from the retaining members.

3. In a wheel structure as defined in claim 1, the cover retaining fingers being also curved in their length so that they are of substantial resilient stiffness.

4. In a wheel structure as defined in claim 3, said cover retaining fingers being provided with a turned back free lamination extremity portion substantially following the shape of the respective fingers and affording reinforcement therefor.

5. In a wheel structure as defined in claim 2, the cover retaining fingers being of circumferentially and axially curved form and having a turned back free lamination extremity portion substantially conformed to the curved shape of the fingers and affording reinforcement therefor.

References Cited in the file of this patent

UNITED STATES PATENTS

| | | |
|---|---|---|
| 291,361 | Kramer | Jan. 1, 1884 |
| 2,113,541 | Blank | Apr. 5, 1938 |
| 2,493,086 | Reifsnyder | Jan. 3, 1950 |
| 2,561,160 | Weasler | July 17, 1951 |
| 2,574,491 | Lyon | Nov. 13, 1951 |
| 2,621,978 | Lyon | Dec. 16, 1952 |
| 2,669,487 | Horn | Feb. 16, 1954 |
| 2,683,628 | Lyon | July 13, 1954 |

FOREIGN PATENTS

| | | |
|---|---|---|
| 494,974 | Canada | Aug. 4, 1953 |